Jan. 29, 1952        J. F. KENDRICK        2,584,026
APPARATUS FOR DRILLING MOTION INDICATORS
Original Filed April 26, 1945        5 Sheets-Sheet 1
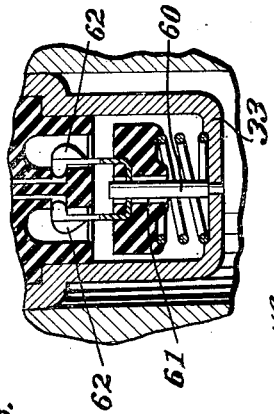
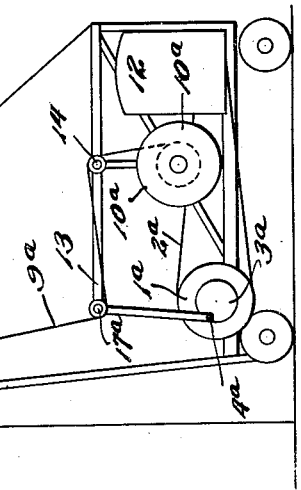
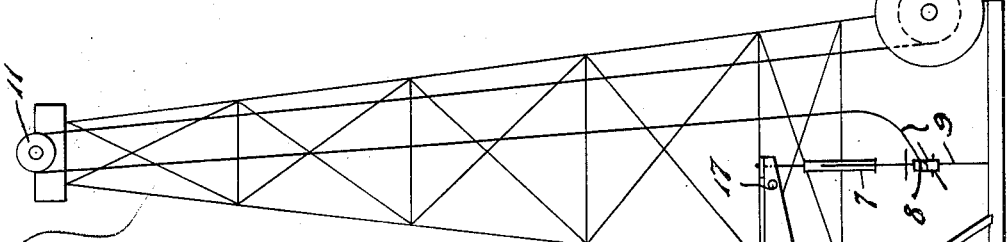
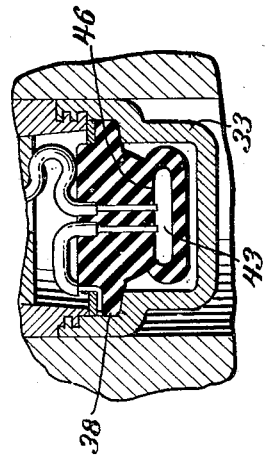
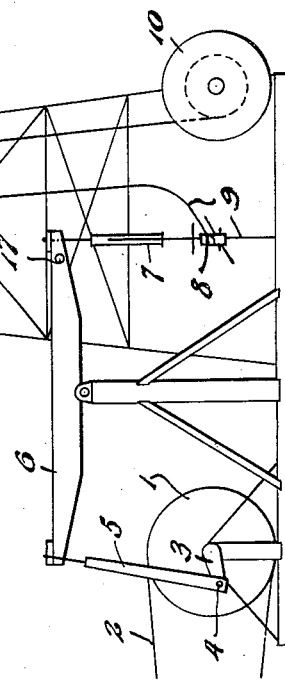
Inventor
John F. Kendrick
By *H. S. McDowell*
Attorney

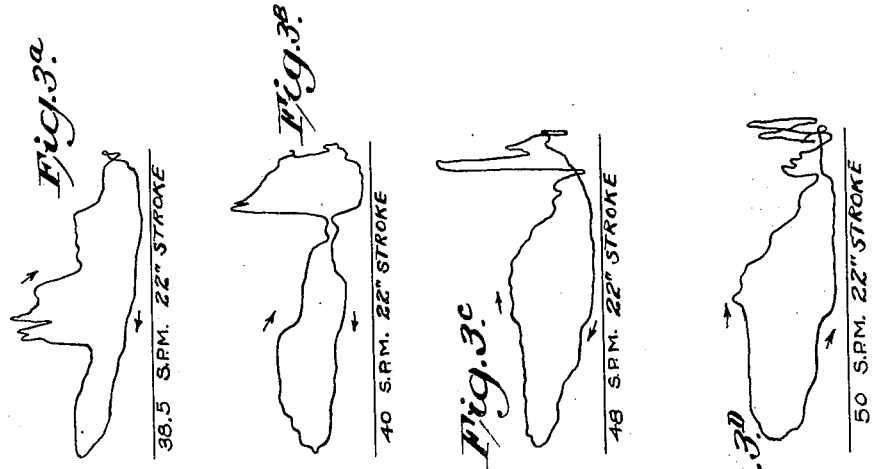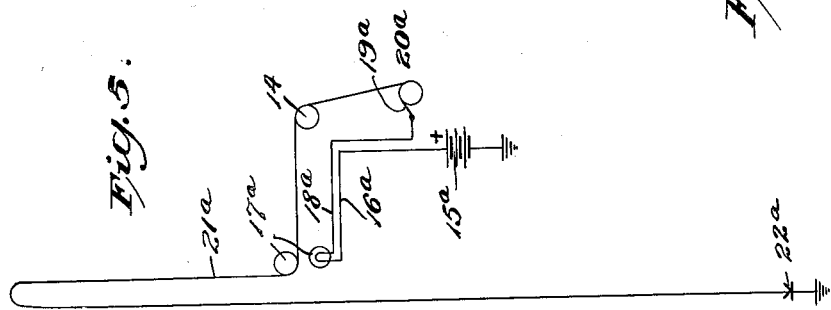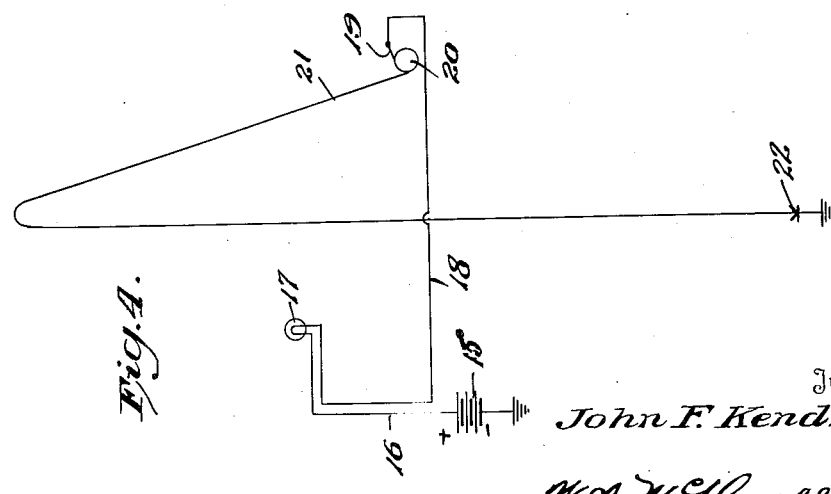

Jan. 29, 1952 J. F. KENDRICK 2,584,026
APPARATUS FOR DRILLING MOTION INDICATORS
Original Filed April 26, 1945 5 Sheets-Sheet 3
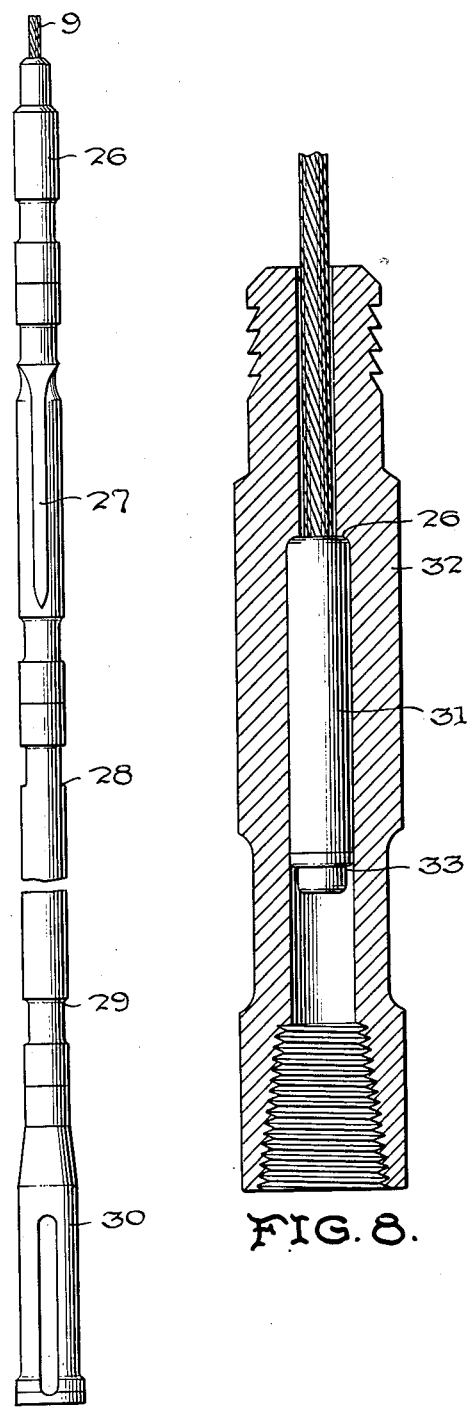
FIG. 7.
FIG. 8.
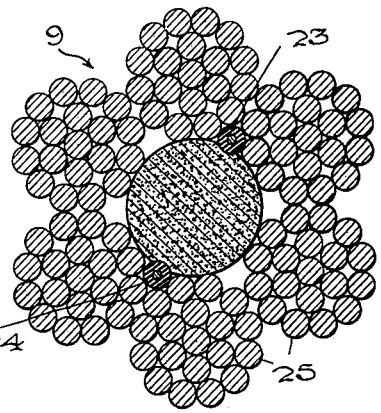
FIG. 6.
INVENTOR.
JOHN F. KENDRICK
BY Raymond W. Matson
AGENT Jan. 29, 1952  J. F. KENDRICK  2,584,026
APPARATUS FOR DRILLING MOTION INDICATORS
Original Filed April 26, 1945  5 Sheets-Sheet 4
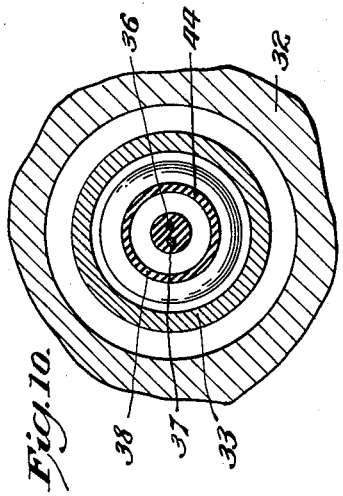
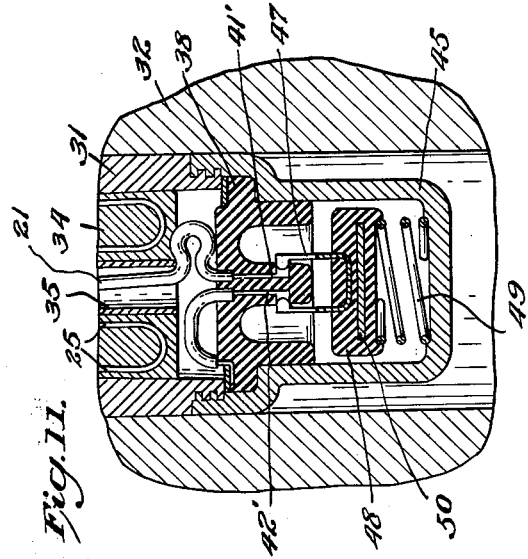
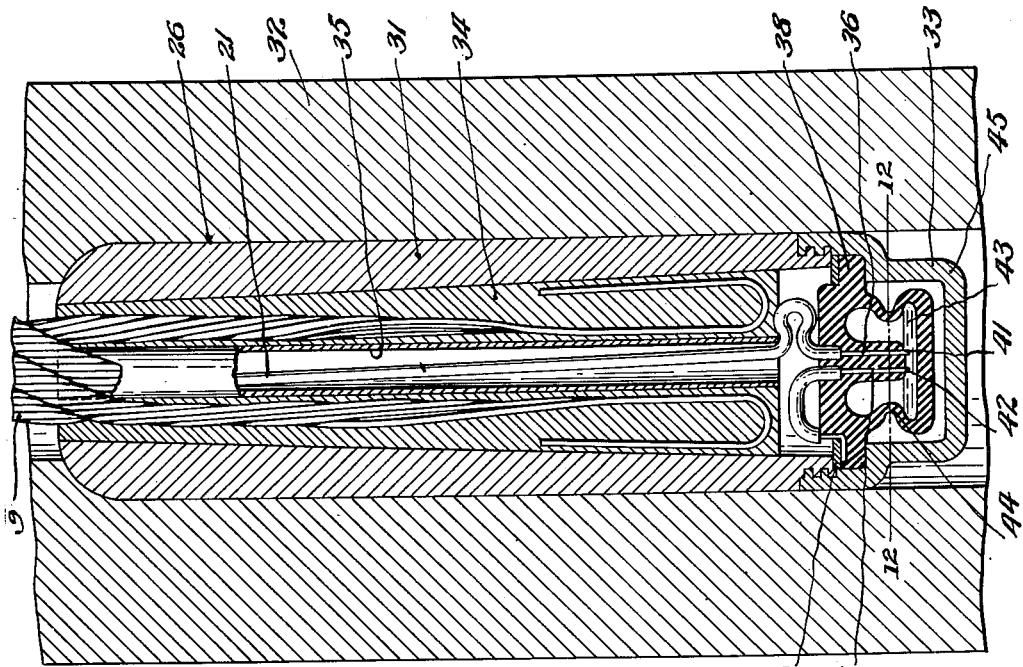
Inventor
John F. Kendrick
By
Attorney Jan. 29, 1952 J. F. KENDRICK 2,584,026
APPARATUS FOR DRILLING MOTION INDICATORS
Original Filed April 26, 1945 5 Sheets-Sheet 5

Inventor
John F. Kendrick

By W. S. McDowell
Attorney

Patented Jan. 29, 1952

2,584,026

UNITED STATES PATENT OFFICE 2,584,026

APPARATUS FOR DRILLING MOTION INDICATORS

John F. Kendrick, Columbus, Ohio

Continuation of application Serial No. 590,498, April 26, 1945. This application October 18, 1949, Serial No. 121,919

3 Claims. (Cl. 255—5)

This is a continuation application, replacing Serial No. 590,498, filed April 26, 1945, Drilling Motion Indicator for Sable Tool Drills. Also pending are continuation divisional application Serial No. 123,353, filed October 25, 1949, for Drilling Cable with Insulated Conductor, replacing Serial No. 782,877, filed October 29, 1947, Steel Cable with Insulated Electrical Conductor and continuation divisional application Serial No. 124,563; filed October 31, 1949, Impact Switch, replacing Serial No. 782,876, filed October 29, 1947, for Impact Switch.

This invention pertains to the operation of elongated elastic structures, such as the cable tool drill, where the lower end of the elastic structure or drill is allowed to strike a relatively immovable body, such as native rock. More particularly, it pertains to a simple impact indicator whereby the operator or driller may judge the reaction of the tools with greater precision than heretofore. As the cable tool drill is an outstanding example of an elongated elastic structure, it will be used in this specification for purposes of description.

As is well known, the cable tool drill consists of a string of tools suspended on a drilling cable which is reciprocated at the surface in various ways. The older form of drilling rig is the pivoted walking beam (Fig. 1), which is still used extensively. The spudder type (Fig. 2) is a somewhat more recent development in cable tool drilling. The adjustment of the reciprocating tools, so that the lower end strikes the formation with impact, chips away the rock and effects the drilling of the bore hole or well, is very important to efficient operation. More and more of the drilling cable is fed into the hole as the drilling progresses, and gradually there is a change from a mechanism that follows closely the physical laws of rigid bodies to one that follows closely the laws of elasticity. The cable tool drill emits a characteristic noise in operation. Also, the cable clamp or the cable itself develops a characteristic jiggle. The occurrence of these signals in relation to the length of the surface stroke, together with their intensity, and his intuition, are the indicators used by the driller to adjust the length of the surface stroke, the strokes per minute and the rate of feed of the drilling cable to do the most effective drilling. This relatively crude technique is generally adequate for shallow holes or well bores, but as the depth increases, its use becomes more and more unsatisfactory and inadequate.

The exact nature of this drill-produced noise is not yet fully understood, but I have made a number of studies that shed considerable new light on its character. It is quite obvious that the noise is the result of the impact of the drilling tools generating a very complex aggregation of vibrations in the drilling cable. This aggregation of vibrations travels up the cable with approximately the velocity of sound in steel, where a wire drilling line is used. The fact that this disturbance is generally inaudible upon reaching the surface for the first time is explained by the many different frequencies comprising the aggregation offsetting each other. However, this disturbance is reflected back down the drilling cable by the clamp of the standard walking beam or the sheave of the spudder, and the reflection filters out some of the frequencies. The disturbance is again reflected by the socket, when it reaches the lower end of the drilling cable, and still more frequencies may be filtered out. The character of the disturbance is so changed, when it again reaches the surface, that it is distinctly audible.

Such a theory finds substantial support in stress diagrams of the drilling cable, taken at the surface with a hydraulic dynamometer. Four such diagrams of a large number actually taken are shown in Fig. 3. These were taken at the speeds indicated, with a 22-inch stroke, when the well bore was approximately 2,900 feet deep and dry, that is, with only a small amount of drilling fluid at the bottom of the hole. The reflection and partial filtering of a very complex summation of traveling vibrations explains the characteristically smooth nose of the dynamometer cards of Fig. 3, as the multiplicity of vibrations most generally nullify each other, before the reflection and filtering, and the disturbance is not recorded by the dynamometer. This theory also explains the obvious fact that the position of the disturbance, on the diagram, is moved upstroke, as the speed increases, as shown successively in Figs. 3a to 3d, as the time of the cycle of the beam or spudder arms is relatively shorter than the time required by the disturbance to travel back and forth in the drilling cable. It is well established that the amplitudes of vibrations are increased by reflection, which explains the magnitudes of the peaks, which are greater than the stress caused by the inertia of the cable and tools. The filtering out of some of a multiplicity of vibrations, with each reflection, explains the jagged characteristics of the profile of the peak. This disturbance causes the characteristic noise of the drill and it will not pass a splice. As long as it is present, the experienced driller uses it to regulate the rate of feed of the temper screw, basing his judgment on experience and the intensity of the sound. When the noise disappears, the driller has to regulate his strokes per minute and the "looseness" of the drilling cable, called the "hitch," so that the noise is replaced by a jiggle of the cable clamp or the cable itself. This is caused by the natural vibration of the drilling cable, which rolls up the cable, somewhat like surf rolling up on a beach, with a half wave length less than the length of the drilling cable.

It is evident that the position of the noise, as represented by the first peak, in relation to the stroke of the drilling mechanism, is affected by the strokes per minute and other diagrams have established that this relationship is likewise affected by the active length of the drilling cable or depth of the hole or well bore. Therefore, dependence on the noise limits the drilling speed seriously on the deeper holes. The noise and jiggle will be absent in the high speed drilling proposed in my co-pending application, Serial No. 585,871, filed March 31, 1945, which has been replaced by continuation application Serial No. 112,858, filed August 29, 1949, Method and Apparatus to Limit Stresses in Elongated Elastic Structures.

Moreover, the intensity of the noise is lessened if the hole or well bore is filled with water and also as the "hitch" is loosened up, that is, as more line is payed out until the drilling cable is relatively "loose," as is explained in detail later. Little is definitely known about the phase relationship of tools and beam, due to the unavailability of suitable instruments. The fundamental theory, which is available in many good reference books on vibrations, (see pages 1 to 87, particularly pages 55 to 64, of Mechanical Vibrations by J. P. Den Hartog, McGraw-Hill Book Co., First Edition), indicates that the tools will be in phase with the beam or spudder arm, when no friction is present, and that they will lag when friction is present. As the noise or jiggle occur when the beam is farther advanced on its return stroke, as the depth of the well bore increases the drillers believe there is as much as a 90° lagging phase difference between the tools and the drilling mechanism, but they make no allowance for the time required for the disturbance causing the signals, be it noise or jiggle, to travel from the tools to the surface. If one accepts the reflected vibration theory, and works the problem backward from the peak, the computation indicates that the tools are substantially in phase with the beam. Also, it will be noted that the down-stroke or the lower of the wavy lines of the diagrams of Figs. 3a to 3d, slopes upward to the left. This indicates that tension is being put into the drilling cable, by the tools being decelerated slower than the drilling mechanism. This suggests a leading phase relationship. The noise of the tools can be heard independently from the rig noises for several hundred feet, after a borehole has been started, and then there is little question that the tools are substantially in phase with the drilling motion, and there is no very acceptable reason why they should get out of phase, as the depth of a dry hole increases. Cable-tool drilling requires a skilled artisan at the present time.

The vibrations that cause the noise subject the drilling cable to high vibratory stresses which shorten its effective life through too early fatigue. The vibration which causes the jiggle causes the pulling out of the lay of the drilling cable, when it occurs when the drilling cable is untwisted, as is frequently the case in deeper drilling. Increased strokes per minute on deeper drilling will eliminate these vibrations, and eliminate early depreciation of the drilling cable. It is evident that a simple relatively inexpensive indicator, that will advise the operator of the instant the tools strike the formation, which will be independent of the vibrations in the cable, fluid in the bore hole and any phase differences between tools and drilling mechanism, will be a distinct advance in the art.

A loose link or "jar" is customarily placed in the string of tools of the cable tool drill, so that, should the tools become stuck, it is possible for the driller to adjust the apparatus to cause the drilling cable to deliver an upward blow, with impact. It is frequently impossible to tell whether the loose link or jar is working or whether the rig is just making a lot of miscellaneous noises. It is important, generally, that this jarring to loosen stuck tools be done with as little delay as possible to avoid the cuttings settling to such an extent as to prolong the freeing or jarring operation, or to cause a time-consuming expensive "fishing" job. A modification of this invention indicates the upward as well as the downward impact.

A wire drilling cable is a system of a number of open coil helical springs, which, when subjected to a pull as the result of the dead weight of tools and the dynamical forces acting on them, will untwist. If slack is thrown in any part of such an untwisted drilling line, it will flex or "dog leg," which is very destructive to cable. Best practice dictates the use of a swivel socket in the string of tools, whose function is to spin as the weight is removed from the cable, during the drilling cycle, and allow the untwisted cable to rewind. It would be an advantage if the operator had some positive indication that the swivel socket is operating. A modification of this invention may be actuated by centrifugal force in addition to the impact downward and/or upward.

Assuming that the tools are substantially in phase with the drilling mechanism, the signal caused by the downward impact of the tools striking the bottom of the bore hole will occur approximately at the bottom of the down-stroke of the drilling mechanism while the signal caused by the centrifugal force of the swivel rope socket will occur approximately at the beginning of the down-stroke of the drilling mechanism, under normal drilling conditions, thus enabling the driller to distinguish between them. This separation of the signals will occur, even if there is a substantial phase difference between the tools and the drilling mechanism. There will be no upwardly directed impact, during normal drilling, as this will occur only when the tools are stuck and the driller is jarring. Then the signal will occur approximately at the end of the up-stroke. Jarring is generally done at such a high speed, that the drilling cable is kept fully twisted up, so the swiveling element of the rope socket will be inoperative. The occurence of the signals under these different conditions and at different points on the stroke cycle, will enable the operator to interpret them with satisfactory accuracy.

It is, therefore, an object of this invention to provide a simple and inexpensive indicator to enable the operator or driller to adjust his drilling motion intelligently. It is another object of this invention to indicate the downward impact of the tools in relation to the surface motion, without appreciable difference in the phase relationship. It is a further object of this invention to indicate the upward impact of the "jar" in addition to the downward impact of the tools in relation to the surface motion, without appreciable difference in the phase relationships. It is still another object of this invention to provide means to indicate the operation of the swivel socket in addition to the downward impact of the tools and/or the upward impact of the "jar," in relation to the surface motion, without appreciable difference in the phase relationships. It is still a further object of my invention to provide means affording the operator an effective indicator for adjusting the drilling "motion" which is independent of the drilling noise, drilling speed or depth of the hole or well bore. It is still another object of my invention to afford the operator an effective means for adjusting the drilling "motion" which is independent of a "wet" or "dry" hole or well bore, the character of the formation and/or the character of the "hitch," that is, the relative tightness or looseness of the drilling cable.

Other objects and advantages of my invention will be apparent from the detailed illustrations and specifications that follow.

For a further understanding of the nature of the invention, and the detailed features of construction thereof, reference is to be had to the following description and the accompanying drawings, wherein:

Fig. 1 is a side elevational view of the walking beam type of cable tool drill;

Fig. 2 is a side elevational view of the spudder type of cable tool drill;

Fig. 3A is a view of a dynamometer card or graph of the stresses in a drilling cable operating at 38.5 strokes per minute and a stroke 22 inches long;

Fig. 3B is a view of a dynamometer card or graph of the stresses in a drilling cable operating at 40 s. p. m., 22 inches long;

Fig. 3C is a view of a dynamometer card or graph showing the stresses in a drilling cable operating at 48 s. p. m., 22 inches long;

Fig. 3D is a similar view showing dynamometer results in a drilling cable operating at 50 s. p. m. with a 22-inch stroke;

Fig. 4 is a wiring diagram of a one wire form of the invention applied to the walking beam type of drill of Fig. 1;

Fig. 5 is a wiring diagram of the one wire form of the invention applied to the spudder type of drill of Fig. 2;

Fig. 6 is a transverse cross sectional view of a standard 6 x 19 drilling cable showing two insulated electrical conductors located circumferentially with the core of the cable and inside and protected by the wire strands of the cable;

Fig. 7 is a vertical elevational view of a representative string of drilling tools;

Fig. 8 is a vertical sectional view through a swivel socket of a string of drilling tools, showing the relationship of an impact switch, the spindle of the swivel socket and the internally located electrical conductor;

Fig. 9 is a vertical sectional view through the spindle of a swivel socket, showing the details of a mercury type impact switch;

Fig. 10 is a cross section at 12—12 of Fig. 9 showing the details of a mercury type impact switch;

Fig. 11 is a vertical sectional view through the spindle of a swivel socket, showing the details of a mechanical type impact switch;

Fig. 12 is a cross section of the switch of Fig. 9 with the auxiliary reservoir eliminated;

Fig. 13 is a cross section of another modification of the switch of Fig. 11;

Fig. 14 is a wiring diagram of a two wire form of the invention applied to the walking beam type of drill of Fig. 1;

Fig. 15 is a wiring diagram of a two wire form of the invention applied to the spudder type of drill of Fig. 2;

Figure 16:
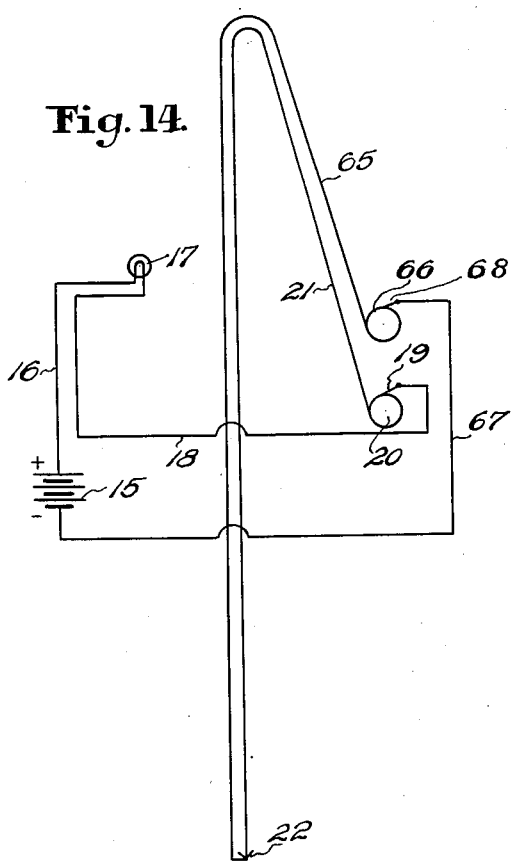
Fig. 16 is a diagram showing the effect of a "high" or "tight" hitch.

Referring to Fig. 1, showing the standard or walking beam type of cable tool drill, a band wheel 1 is driven by an engine (not shown) through belt 2. The latter turns a crank 3, mounted on the same shaft, which imparts a reciprocating motion to the drilling cable 9 through the pitman 5, walking beam 6, the temper screw 7 and clamp 8. The unused portion of the drilling cable is stored on the bull wheel 10 from which it is led over the crown block 11 and into the well bore. The hitch is effected by means of the clamp 8, and the line is fed into the well bore, as the drilling proceeds, by means of temper screw 7.

In Fig. 2, showing the spudder type of cable tool drill, power supplied by engine 12 is transmitted to band wheel 1a by means of belt 2a. The crank 3a is mounted on the same shaft as band wheel 1a, and imparts a reciprocating motion to the drilling line 9a, through the wrist pin 4a, the pitman 5a and the spudder arms 13, which are pivoted at 14. The unused drilling line is stored on bull wheel 10a, from which it is led to crown block 11a and into the well bore. The "hitch" is effected by positioning the bull wheel 10a, and line is fed into the well bore, as the drilling progresses, by slipping the brake (not shown) associated with bull wheel 10a.

The drilling cable stress diagrams reproduced as Figs. 3A, 3B, 3C and 3D illustrate graphically the lack of precision and difficulties resulting from the driller being forced to regulate the drilling "motion" from anything observable at the suface, as explained above. This series of stress diagrams was taken with a hydraulic dynamometer placed in series with the temper screw. The depth was, for all practical purpose, the same in each case—2,900 feet. Five inch tools, with a short stem, weighed approximately 1,200 pounds. The drilling cable was ⅞ inch, 6 x 19. The speed of diagram 3A was 38.5 s. p. m.; 3B was 40 s. p. m.; 3C was 48 s. p. m. and 3D was 50 s. p. m. The same 22-inch stroke was used in each case. The diagrams are shown as traced clockwise.

The noise occurs at the peak on the up-stroke and it should be noted that this peak moves up-stroke, as the s. p. m. increase. At a high enough speed, the noise disappears. This happens on very deep wells, unless an excessively low s. p. m. be used. There is no definite indication at what point the impact of the tools occurs in relation to the temper screw stroke and the intensity of the sound varies from stroke to stroke and depending on whether the hole is "wet," that is full of formation water or "dry," that is with only the drilling fluid. These diagrams were made at speeds below resonance or the critical velocity. The conditions are still further complicated when operation is above the critical velocity as proposed in my co-pending application, Serial No. 112,858. A simple practical electrically operated bottom hole indicating device will eliminate these uncertainties due to phase differences and distortion due to transmission through air or metal and be an important advance in the art of cable tool drilling.

A typical wiring diagram of this invention, as installed on a walking beam type cable tool drill, and utilizing one insulated conductor and a ground is shown in Fig. 4. A source of electrical energy 15, most frequently the lighting plant of the rig, but as alternates a battery or outside source, has its negative side grounded. The positive side is connected to the insulated conductor 16 which in turn is connected to the visual signaling and/or audible alarm device 17. An electric light is preferred, but under some conditions a bell will be substituted and under other conditions a bell may well be used in conjunction with a light. The signaling device may be located at any point convenient to the operator or driller, but as it is helpful to observe the point where the signal operates in relation to the stroke of the drilling clamp 8 (Fig. 1), a preferred location for the signal is at the end of the beam 6 (Fig. 1) or on the spudder arms (Fig. 2). From the signaling device 17, the conductor 18 leads to a stationary brush 19 and revolving collector ring 20, associated with the bull wheel 10 (Fig. 1). The insulated conductor 21, associated with the drilling cable, as will be more fully described later, passes over the crown block 11 (Fig. 1) and down into the well bore. At the lower end of the drilling cable, the insulated conductor is connected to an impact switch 22 which also will be fully described later. The other side of the switch 22 is connected to the ground through the drilling cable, tools and any fluid in the well bore. When it is desired to avoid grounding the return circuit, another insulated conductor 67, Fig. 14, will be used, which will lead from the negative side of the source of electrical energy 15 to another sliding stationarily mounted brush 68, Fig. 14, through another rotating collector ring 66, Fig. 14, associated with the bull wheel 10 (Fig. 1) connected to another insulated conductor 65, Fig. 14, associated with the drilling cable. The lower end of this additional insulated conductor is then connected to the negative side of the switch, located at the lower end of the drilling cable.

These wiring diagrams need be modified in no important respect to apply them to the spudder type of cable tool drill, as is evident from Figs. 5 and 15. A source of electrical energy 15a, Fig. 5 has its negative side grounded. The positive side is connected to the insulated conductor 16a, which in turn is connected to the visual signaling and/or audible alarm device 17a. A preferred location for the signal is near the end of the spudder arms 13a. From the signaling device 17a, the conductor 18a leads to a stationary brush 19a and revolving collector ring 20a, associated with the bull wheel 10a (Fig. 2). The insulated conductor 21a, associated with the drilling cable, as will be more fully described later, passes over the crown block 11a (Fig. 2) and down the well bore. At the lower end of the drilling cable, the insulated conductor is connected to an impact switch 22a, which will be fully described later. The other side of the switch 22a is connected to the ground through the drilling cable, tools and any fluid in the well bore.

When it is desired to avoid grounding the return circuit, another insulated conductor 67, Fig. 15, will be used, which will lead from the negative side of the source of electrical energy 15a to another sliding stationarily mounted brush 68a, through another rotating collector ring 66a, associated with the bull wheel 10a (Fig. 1) connected to another insulated conductor 65a, Fig. 15, associated with the drilling cable. The lower end of this additional insulated conductor is then connected to the negative side of the switch 22a, located at the lower end of the drilling cable.

Fig. 6 shows the insulated conductors 23 and 24 arranged between the core of the wire drilling cable 9 (Fig. 1) or 9a (Fig. 2) and the wire strands 25 of the drilling cable. While two such conductors are shown, only one may be used in conjunction with a ground or a plurality of conductors may be used. It is desirable that these conductors be insulated with an oil resistant insulation and that they be positioned helically in the groove between two adjacent strands of the drilling cable, especially when a copper conductor is used, so that any tendency to creep is minimized and so that the conductor or conductors will have the same stretch, distributed in the same way, as the drilling cable. Under normal drilling conditions, the cable is elongated longitudinally by its own weight, the weight of the tools and by inertia. It untwists slowly, and retwists rapidly due to the geometry of the helix and the operation of the swivel rope socket. Slack may be thrown into it at some point along its length. Placing the insulated conductor helically in the groove between two adjacent strands minimizes the crushing forces, as adjacent strands abut to form a ring, which absorbs the compressive forces tangentially. The strands of the drilling cable support the insulated conductor or conductors, which have relatively low tensile strengths. The insulated conductors can elongate, untwist and retwist with the drilling cable, with the minimum of relative movement between the strands and the insulated conductor and with the minimum of cold working. While a standard 6 x 19 drilling cable is illustrated, a wide range of special drilling cables such as Filler wire, Seale, Warrington, Preformed and Independent Wire Center, to mention the more common, may be substituted equally satisfactorily. Inasmuch as the voltage drop is not an important factor, a steel wire insulated conductor can be substituted for a copper wire insulated conductor with advantages including lower cost and greater strength and elasticity.

Fig. 7 shows the customary drilling arrangement of the string of tools, wherein 9 is the drilling cable, 26 is the swivel socket, 27 the drilling jars, 28 and 29 the top and bottom of the stem and 30, the bit. Except for the rope socket 26, the exact design and construction of the components of the drilling tools has no significance in respect to this invention. For instance, when reaming or fishing, it is general practice to place the jar 27 between the stem 28—29 and the bit 30 or fishing tool, but such a change will not affect the satisfactory functioning of this invention. The detail construction of the swivel socket is shown in Fig. 8, and it will be noted that the drilling cable is babbitted into a spindle 31 which is free to turn inside the swivel housing 32. Its function is to permit the drilling cable to rewind, instead of to bend or "dog-leg," whenever the tension in the drilling cable is reduced.

Fig. 8 shows the application of the invention to the swivel socket, when the internal conductor drilling cable 9 is used. 33 is the switch and its general design will be apparent from an inspection of the enlarged view of Fig. 9, wherein 32 is the swivel housing, 9 is the drilling cable, 31 is the spindle of the swivel socket, into which the stranded drilling cable is babbitted as shown at 34, and which is free to spin about the axis of the rope socket 32 whenever the tension of the drilling cable is reduced.

A tube 35, with external ridges to key it to the babbitt, may be inserted to afford a passage for the electrical conductor. The insulation of the electrical conductor may be protected from the heat of babbitting the drilling cable in a number of ways. The preferred way is to pull the electrical conductor out from the center of the drilling cable, between any pair of strands, until the babbitting is completed, whereupon it is rethreaded through the tube.

Fig. 9 shows the preferred embodiment of the switch, wherein 36 and 37 are two insulated conductors molded into the main body 38 of the switch, which is made from an oil-resisting, suitably elastic material such as synthetic rubber or a plastic. Conductor 36 is joined with centrally located conductor 21, of the drilling cable 9, with a fluid-tight splice. Conductor 37 is grounded by means of gripping its insulation stripped end under the adapting and reinforcing disk 40. When it is desired to use two centrally located conductors in the drilling cable, conductor 37 will be joined to this second conductor with a fluid-tight splice. The lower stripped ends of conductors 36 and 37 protrude slightly through the main body of the switch, as at 41 and 42, and are normally submerged in mercury 43, which completes the electrical circuit. The mercury is contained in a suitably elastic reservoir, formed by a circumferentially pleated extension 44 of the main body of the switch 38. The switch is held in fixed relation to the spindle 31 of the swivel socket 32 by means of a housing 45 threadedly connected to the lower end of the spindle 31.

In operation, the inertia of the mercury 43, under the influence of a downwardly directed impact, forces the reservoir 44 downwardly, until its movement is checked through contact with the housing 45. This removes the mercury 43 from contact with the conductors 41 and 42 and interrupts the flow of current through the circuit, causing a signal in the indicator at the surface. With the termination of the impact, the elastic construction of the longitudinal walls of the reservoir 44 raise the bottom of the reservoir, bringing the mercury 44 again into contact with the conductors 41 and 42, thereby closing the circuit and permitting the flow of electrical energy. The switch will be proportioned with a sufficiently stiff walled reservoir, so that the terminals 41 and 42 will not be uncovered by the reaction to normal inertia.

In the event of an upwardly directed impact, which would be the case if the jars 27 (Fig. 7) should operate, intentionally or otherwise, the inertia of the mercury 43 would carry it into the upper section 46 of the reservoir, again opening the circuit and interrupting the flow of electrical energy, resulting in a signal at the surface. In the event this indication of upward impact is not desired, it is only necessary to modify the design to eliminate the upper section 46 of the reservoir, as shown in Fig. 12.

When the spindle 34 of the swivel socket spins, as is the case when the tension in the drilling cable is lessened, the centrifugal force thus created will cause the surface of the mercury to assume a curve, which will remove it from contact with the conductors 41 and 42, open the circuit, stopping the flow of electrical energy and giving a signal on the surface. Should such an indication be undesirable, it is only necessary to shorten the diameter of the reservoir and increase the thickness of the mercury used to eliminate it. As illustrated in Fig. 9, therefore, the switch will indicate downward impact, upward impact and spinning of the swivel spindle, and the occurance of the signal in relation to the surface stroke will give the operator definite advice of the proper functioning of the tools at the bottom of the wel bore. However, a slight modification of the design of the switch will effectively eliminate the indication of upward impact or the functioning of the swivel, or both, as has been fully described above.

A mechanical modification of the switch is shown in Fig. 11 in which like reference numbers designate like parts having the same function as in Fig. 9. The switch is held in fixed relation to the spindle 31 of the swivel socket 32 by means of a housing 45 threadedly connected to the lower end of the spindle 31. The conductors 41' and 42' are molded into a cylindrical projection of the main body 38 of the switch. Diametrically opposite sides of this cylindrical projection are flattened to receive the terminal plates of conductors 41' and 42', which are slightly concave inward to mate with the terminals of the U-shaped connector 47, which is mounted on the floating base 48, the latter being supported on the housing 45 by means of the open coil helical spring 49. The inertia of floating base 48 is built up by means of the mass 50 molded in said base. When in its neutral position, connector 47 short circuits the conductors 41' and 42' thereby completing the circuit. Under the influence of a downwardly directed impact, floating base 48 compresses the spring 49 and connector 47 is moved downwardly out of contact with connectors 41' and 42'. The flow of current is interrupted, resulting in a suitable signal being given at the surface of the well bore. When the downward impact is expended, spring 49 returns the floating base 48 to its netural position, again bringing connector 47 into contact with conductors 41' and 42'.

Under the influence of an upwardly directed impact, floating base moves upward under the influence of its inertia and the thrust of spring 49. Connector 47 is thereby removed from contact with conductors 41' and 42', resulting in the interruption of the current, which gives a suitable signal at the top of the well bore. When the impact is dissipated, the mass of floating base 48 returns it to its neutral position, which brings connector 47 into contact with connectors 41 and 42 and the cycle is completed. Where the indication of the upward impact is undesirable, it may be eliminated from this design either by providing shoulders on the cylindrical projection, which will check the upward movement of connector 47 or increase the length of the cylindrical projection, so that contact with floating base 48 will check the upward movement of the connector 47. The design as shown does not permit the indication of the spinning of the spindle 31. However, if the floating base 48 be guided by the cylindrical projection 60, Fig. 13, slidingly engaging a hole 61, Fig. 13 provided in the floating base 48 and the mass of the terminals of connector 47 be increased as indicated at 62, Fig. 13, the centrifugal force, as the spindle spins will separate the ends of the connector 47, thereby stopping the flow of current, and giving a signal at the top of the well bore. When the spindle 31 ceases to spin, the elasticity of connector 47 will cause its terminals to return to their neutral position, permitting a resumption of the flow of current, thereby completing the cycle.

To review and summarize, the driller runs the tools into the hole until he "feels" bottom. Due to the dead weight of drilling cable and tools acting on the spiral structure of the cable, the drilling cable is then well untwisted and vulnerable to kinking or "dog-legging" whenever the tension is reduced.

When a rope socket, with a swiveling element, is used, the drilling cable is shortened, as soon as the drilling motion is started, due to the cable retwisting. The driller describes this by saying "the swivel takes-up." The driller then gets the signal that he is drilling with a very "high" or "tight" hitch. When an unspliced steel drilling cable is used, this manifests itself with an excessively loud noise. When a spliced steel cable is used, this manifests itself with an excessively violent jiggle of the clamp. The driller then lets more line into the bore hole, either by slipping the cable through the clamp or letting out the temper screw, in the case of a walking beam or by slipping the brake, in the case of the spudder.

Figure 16A:
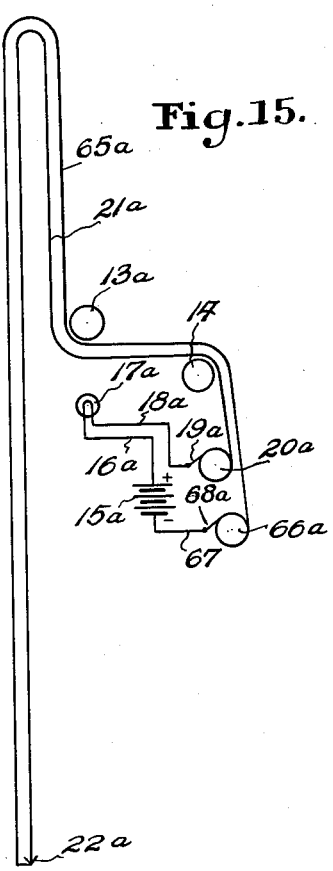
Fig. 16a is a diagram showing the effect of an intermediate hitch.
Figure 16B:
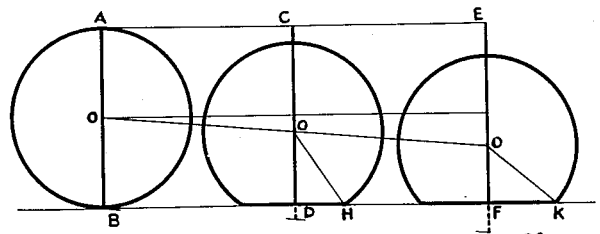
Fig. 16b is a diagram showing the effect of a "low" or "loose" hitch.

Just what the effect of letting more line into the well bore is shown in the diagrams of Figs. 16 to 16b inclusive. These assume that the movement of the string of tools is simple harmonic motion, which is only a rough approximation. It will be remembered that this motion is the projection, on a straight line, of a point following a circular path with a uniform velocity. In simple harmonic motion, the velocity at any instant is proportional to line DH of Fig. 16a and line FK of Fig. 16b. As the bit cannot go any farther than the bottom of the hole, the effect of letting more line into the hole is to increase the velocity at the instant of impact. As the magnitude of the impact varies as the square of the velocity at impact, a loose hitch, when it does not cause an impact that needlessly batters the bit, generally drills the fastest. The reason the surface signals are more pronounced, when a tight or high hitch is used, is that the line is under greater tension at the instant of impact. The traveling wave is, therefore, the summation of vibrations with higher frequencies, and has a higher pitch and the amplitude of the natural vibration is increased by the greater stretch of the drilling cable, and the jiggle is, therefore, intensified.

Under present conditions, long experience has taught the driller the best intensity of the noise or jiggle, et cetera, to use under various conditions. However, the feet drilled per tour or shift varies greatly with different drillers. It will be noted that both of these signals are time functions and that they will not have time to manifest themselves, if present drilling speeds are increased at the greater depths. This is one of the two handicaps that limits the impacts per minute, and hence the drilling speed. Therefore, the substitution of an indicating device that will be positive under all practical conditions of shallow or deep drilling, slow or fast speed drilling, hard or soft drilling and wet or dry drilling, will be an important step in the improvement of cable tool drilling.

The drilling motion indicator disclosed herein is electrically operated, and the circuit is normally closed. As it will be impossible to avoid considerable inductance in that part of the circuit combined with the drilling cable, basing operations on the interruption of the indicating signal insures immediate response to the significant movement of the tools. The point where the signal is interrupted in relation to the position of the beam or spudder arms will provide the driller with the most significant information. Some experimenting will be necessary to refine the technique, and it will be helpful to compare the signals given by the indicator with those given by the two vibrations in the drilling cable. Due to the elimination of any appreciable lag between the impact of the bit and the signal reaching the surface, the light will go out or the bell or buzzer will stop sounding an observable length of time before the beam or spudder arms reach the bottom of the down-stroke, when drilling with a relatively loose hitch, under present drilling conditions, below fundamental resonance. As the hitch is made tighter, the signal will be interrupted closer and closer to the point where the beam or spudder arms reach the bottom of the down-stroke. After the bit strikes the bottom of the bore hole, the light will flicker or the audible signal will work intermittently, until the string of tools stops vibrating intensely, the duration of such intermittent operation of the signal giving an indication of the character of the impact, advising the driller whether to tighten or loosen the hitch. The driller, therefore, will regulate the rate of feed of the drilling cable to maintain an approximately fixed relationship between the point where the signal is interrupted and the position of the well defined surface stroke of the drilling cable.

Should the string of tools become stuck to an extent to require jarring, the driller usually detaches the clamp, slacks off and then reels in the drilling cable, until he feels the jar close. He then slacks off and amount depending on the size of the cable and the depth, which he has learned by experience but which can be computed, and resumes the drilling motion. As the jar closes, the impact is upwardly directed and the driller will regulate the feeding mechanism so as to maintain an approximately fixed relationship between the point where the signal is interrupted and the well defined up-stroke of the drilling cable.

What I claim as new and desire to secure by Letters Patent is:

1. A drilling motion indicator for a cable-tool drill comprising an electric circuit including an indicating device connected to a source of energy, a drilling cable including an insulated conductor electrically connected to said indicating device, electric circuit opening and closing means connected to said insulated conductor, said means being electrically connected to said source, a string of impact tools positioned at the lower end of said cable, means for reciprocating the upper end of said cable to effect the drilling, said string of tools being connected to said cable by a tubular swiveling element having a chamber formed therein, said means being mounted in said chamber and being actuated in response to the motions of said swiveling element to operate said indicating device.

2. The combination recited in claim 1 in which said swiveling element includes a cap joined thereto form the chamber.

3. A drilling motion indicator for a cable-tool drill comprising an electric circuit including an indicating device connected to a source of energy, a drilling cable including an insulated conductor electrically connected to said indicating device, an electric switch connected to said insulated conductor, said switch being electrically connected to said source, a string of impact tools positioned at the lower end of said cable, means for reciprocating the upper end of said cable to effect the drilling, said string of tools being connected to said cable by a tubular swiveling element having a chamber formed therein, said switch being mounted in said chamber and being actuated to open said circuit upon impact of said tools to deenergized said indicating device.

JOHN F. KENDRICK.

REFERENCES CITED

The following references are of record in the file of this patent:

UNITED STATES PATENTS

| Number | Name | Date |
|---|---|---|
| 76,242 | Peevy | Mar. 31, 1868 |
| 478,791 | Gardner | July 12, 1892 |
| 665,998 | Davis | Jan. 15, 1901 |
| 994,712 | Bishop | June 13, 1911 |
| 1,395,091 | Caverly | Oct. 25, 1921 |
| 1,396,625 | Corrigan | Nov. 8, 1921 |
| 1,406,768 | Slater | Feb. 14, 1922 |
| 1,523,629 | Bullock | Jan. 20, 1925 |
| 1,530,284 | Oliver et al. | Mar. 17, 1925 |
| 1,567,197 | Schmidt | Dec. 29, 1925 |
| 1,666,461 | Lord | Apr. 17, 1928 |
| 1,706,481 | Chadderdon | Mar. 26, 1929 |
| 1,891,330 | Le Compte et al. | Dec. 20, 1932 |
| 2,014,214 | Smith | Sept. 10, 1935 |
| 2,060,403 | Sweet | Nov. 10, 1936 |
| 2,152,233 | Baker | Mar. 28, 1939 |
| 2,212,700 | Peterson et al. | Aug. 27, 1940 |
| 2,214,197 | Jackson | Sept. 10, 1940 |
| 2,224,439 | Lee | Dec. 10, 1940 |
| 2,266,623 | Gurasich | Dec. 16, 1941 |
| 2,281,044 | Oplinger | Apr. 28, 1942 |
| 2,349,041 | Hare | May 16, 1944 |
| 2,365,858 | Binkley | Dec. 26, 1944 |
| 2,394,759 | Edwards | Feb. 12, 1946 |
| 2,398,512 | Berry | Apr. 16, 1946 |
| 2,425,193 | Lehr | Aug. 5, 1947 |
| 2,470,630 | Marcou | May 17, 1949 |
| 2,483,944 | Spang | Oct. 4, 1949 |

OTHER REFERENCES

Timoshenko: Vibration Problems in Engineering, 2nd ed., 1937, pp. 38–49.

Carstarphen: The C. S. M. Magazine, pp. 15–30, September 1931.

Kendrick et al.: Tras. ASME, vol. 123, pp. 15–31, 1937.

Sprengling et al.: Drilling Practice, pp. 64–72, 1940.

Kendrick: Oil & Gas Journal, October 7, 1948, Towards a Better Understanding of Cable Tool Drilling.

Slonneger: Production Practice, pp. 179–188, 1937.

Peterson: Petroleum Engineer, pp. 33–36, February 1939.

Kendrick, Oil & Gas Journal, December 13, 1947, Drilling Stresses Present in Cable-Tool Operations, part I.

Kendrick: Oil & Gas Journal, July 1, 1948, Drilling Stresses Present in Cable-Tool Operations, part II.

Kendrick: Oil & Gas Journal, May 26, 1949, Use of Cable Tools in Wet Holes and at High Stroke Rates.

Uren: Petroleum Production Engineering, vol. 1, pp. 170–172, 2nd ed. 1934.

Uren: Petroleum Production Engineering, 3rd ed., 1946, pp. 183–189.